US008319838B2

(12) United States Patent
Chiang et al.

(10) Patent No.: US 8,319,838 B2
(45) Date of Patent: Nov. 27, 2012

(54) METHOD FOR ENABLING AUTO-FOCUS FUNCTION, ELECTRONIC DEVICE THEREOF, RECORDING MEDIUM THEREOF, AND COMPUTER PROGRAM PRODUCT USING THE METHOD

(75) Inventors: Chi-Pang Chiang, Taoyuan County (TW); Jen-Chih Chang, Taoyuan County (TW); An-Chi Tai, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 470 days.

(21) Appl. No.: 12/350,968

(22) Filed: Jan. 9, 2009

(65) Prior Publication Data
US 2010/0079601 A1 Apr. 1, 2010

(30) Foreign Application Priority Data
Sep. 30, 2008 (TW) .............................. 97137592 A

(51) Int. Cl.
*G03B 13/36* (2006.01)
(52) U.S. Cl. ................. 348/208.1; 348/208.12; 348/345
(58) Field of Classification Search ............ 348/208.12, 348/208.16, 345, 208.1; 396/52, 89, 54
See application file for complete search history.

(56) References Cited

U.S. PATENT DOCUMENTS

| 5,422,671 | A | * | 6/1995 | Yamada et al. ............... 348/345 |
| 7,379,091 | B2 | * | 5/2008 | Yost et al. ................... 348/208.1 |
| 7,616,252 | B2 | * | 11/2009 | Ito et al. ........................ 348/345 |
| 2007/0077046 | A1 | * | 4/2007 | Lim ................................ 396/52 |
| 2008/0056702 | A1 | | 3/2008 | Chou et al. |

FOREIGN PATENT DOCUMENTS
TW 200740210 10/2007

OTHER PUBLICATIONS
"Office Action of Taiwan Counterpart Application", issued on Dec. 26, 2011, p. 1-p. 5.

* cited by examiner

*Primary Examiner* — W. B. Perkey
(74) *Attorney, Agent, or Firm* — Jianq Chyun IP Office

(57) ABSTRACT

A method for enabling an auto-focus function, an electronic device thereof, a recording medium thereof, and a computer program product using the method are provided for the electronic device having a function of capturing images. In the present method, whether the electronic device is in a static state is first detected. If the electronic device is remained in the static state for a first time period, an auto-focus function is enabled and the electronic device is switched to the focusing mode. As a result, a user no longer needs to start the auto-focus function manually, and convenience and fluency of capturing images can be increased substantially.

15 Claims, 2 Drawing Sheets

METHOD FOR ENABLING AUTO-FOCUS FUNCTION, ELECTRONIC DEVICE THEREOF, RECORDING MEDIUM THEREOF, AND COMPUTER PROGRAM PRODUCT USING THE METHOD

CROSS-REFERENCE TO RELATED APPLICATION

This application claims the priority benefit of Taiwan application Ser. No. 97137592, filed on Sep. 30, 2008. The entirety of the above-mentioned patent application is hereby incorporated by reference herein and made a part of specification.

BACKGROUND OF THE INVENTION

1. Field of the Invention

The present invention relates to a method for capturing images. More particularly, the present invention relates to a method for switching to a focusing mode during image capturing, an electronic device thereof, a recording medium thereof, and a computer program product using the same.

2. Description of Related Art

A commonly used digital cameral generally applies a two-stage shutter design. A first-stage shutter is mainly in charge of a focus function and setting an exposure value and a white balance value, and a second-stage shutter is in charge of enabling a capturing action. Therefore, when the digital camera having the two-stage shutter design is utilized, a capture button can be half-pressed to enable an auto-focus function. At this time, a lens of the digital camera can focus on an object displayed at a center of the screen or on a human face displayed in the screen. Then, after a user confirms that an image in the screen is the image wanted, the user can fully presses the capture button (i.e. presses both the first-stage and the second-stage shutter) so as to capture an image.

However, a user who does not frequently use the digital camera may not know the digital camera has such two-stage shutter design, and accordingly the user may not know how to enable the auto-focus function. Moreover, the user has to repeatedly practice to grasp a shooting knack of the two-stage shutter. However, the user usually can not know the exact timing to press the first-stage shutter for enabling the auto-focus function before capturing images. Accordingly, a correctly focused and clear image cannot be successfully captured.

SUMMARY OF THE INVENTION

Accordingly, the present invention is directed to a method for enabling an auto-focus function, by which the auto-focus function can be enabled according to a state of an electronic device so as to increase a convenience of capturing images.

The present invention is directed to an electronic device, which can enable an auto-focus function if the electronic device is remained in a static state for a specific time period, so as to avoid manually enabling the auto-focus function.

The present invention provides a method for enabling an auto-focus function, which is suitable for an electronic device having a camera function. In the present method, whether the electronic device is in a static state is first detected. If the electronic device is remained in the static state for a first time period, the auto-focus function is enabled and the electronic device is switched to a focusing mode.

In an embodiment of the present invention, the step of detecting whether the electronic device is in the static state includes continually capturing preview images via the electronic device, and comparing two preview images captured before and after so as to obtain different points between these two preview images. If a quantity of the different points is less than a predetermined value, the electronic device is judged to be in the static state.

In an embodiment of the present invention, if the electronic device is remained in the static state for the first time period, the step of enabling the auto-focus function and switching the electronic device to the focusing mode includes comparing the two preview images captured before and after for obtaining the different points, and enabling the auto-focus function and switching the electronic device to the focusing mode if the quantity of the different points detected.

In an embodiment of the present invention, the different points include variations of pixel brightness of the preview images or moving of edge positions of the preview images.

In an embodiment of the present invention, after the step of enabling the auto-focus function and switching the electronic device to the focusing mode, the method further includes comparing the two preview images captured before and after for obtaining the different points, and dismissing the focusing mode if the quantity of the different points is greater than or equal to the predetermined value.

The present invention provides an electronic device including a static state detecting module and an auto-focus module. The static state detecting module is used for detecting whether the electronic device is in a static state. The auto-focus module is connected to the static state detecting module, and is used for enabling an auto-focus function and switching the electronic device to a focusing mode when the electronic device is remained in the static state for a first time period.

In an embodiment of the present invention, the electronic device further includes an image capturing unit connected to the static state detecting module and the auto-focus module, and is used for continually capturing preview images.

In an embodiment of the present invention, the static state detecting module compares two preview images captured before and after so as to obtain different points between the two fore-and-aft preview images. Wherein, if a quantity of the different points is less than a predetermined value, the electronic device is judged to be in the static state.

In an embodiment of the present invention, the different points include variations of pixel brightness of the preview images or moving of edge positions of the preview images.

In an embodiment of the present invention, the static state detecting module compares two preview images captured before and after every the second time period for obtaining the different points. Wherein, if the quantity of the different points detected each time is less than the predetermined value before the first time period is reached, the auto focus module then enables the auto-focus function, and the electronic device is switched to the focusing mode.

In an embodiment of the present invention, when the static state detecting module determines that the quantity of the different points is greater than or equal to the predetermined value, the auto-focus module dismisses the focusing mode of the electronic device.

The present invention provides a storage medium, which is used for storing a computer program. The computer program includes a plurality of program codes, which can be loaded to the electronic device for executing the aforementioned method for enabling an auto-focus function.

The present invention provides a computer program product. The program instructions contained in the computer program product can be loaded to an electronic device having a camera function for executing the following steps. First, whether the electronic device is in a static state is detected. Next, if the electronic device is remained in the static state for a first time period, the auto-focus function is enabled and the electronic device is switched to a focusing mode.

In the present invention, the state of the electronic device is continually detected, and when the electronic device is remained in the static state for a first time period, the auto-focus function is enabled. By such means, when an image is about to be captured, manually enabling the auto-focus function is avoided, so that convenience and fluency for capturing the images are improved.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

To fully convey the spirit of the present invention, embodiments are provided below for describing the present invention in detail.

Figure 1:
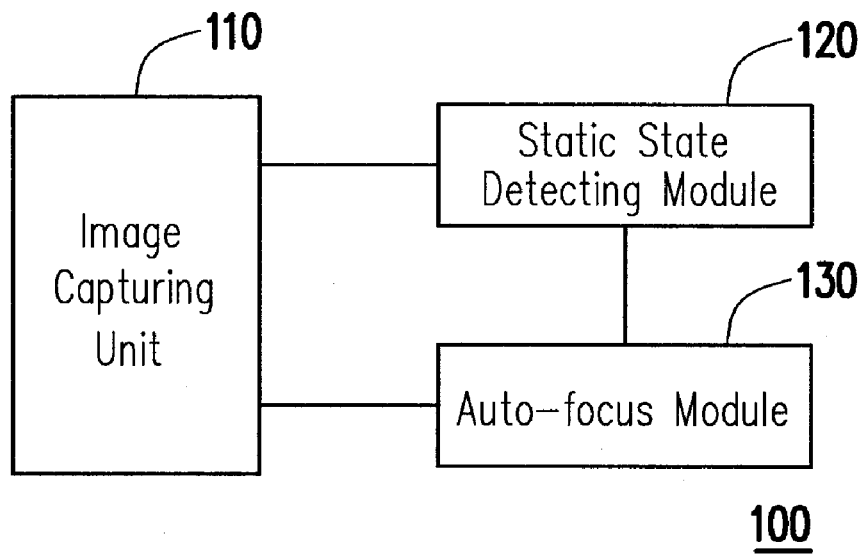
FIG. 1 is a block diagram illustrating an electronic device according to an embodiment of the present invention.

FIG. 1 is a block diagram illustrating an electronic device according to an embodiment of the present invention. Referring to FIG. 1, the electronic device 100 includes an image capturing unit 110, a static state detecting module 120 and an auto-focus module 130. In the present embodiment, the electronic device 100 is, for example, a digital camera, or a cell phone, a personal digital assistant (PDA) or a smartphone, etc. having a camera function to capture images, which is not limited by the present invention.

Wherein, the image capturing unit 110 includes a camera lens, which can continually capture preview images, and display the preview images on a screen (not shown) of the electronic device 100. When the image displayed on the screen is required to be captured, the user can press a capture button (not shown) to drive the image capturing unit 110 to capture the image.

The static state detecting module 120 is connected to the image capturing unit 110, which is mainly used for detecting whether the electronic device 100 is in a static state according to the preview images provided by the image capturing unit 110. The auto-focus module 130 is connected to the image capturing unit 110 and the static state detecting module 120, and is used for enabling the auto-focus function of the electronic device 100 when a state the electronic device 100 is in accord with a specific condition, so as to adjust a focus of the image capturing unit 110 and switch the electronic device 100 to a focusing mode.

Figure 2:
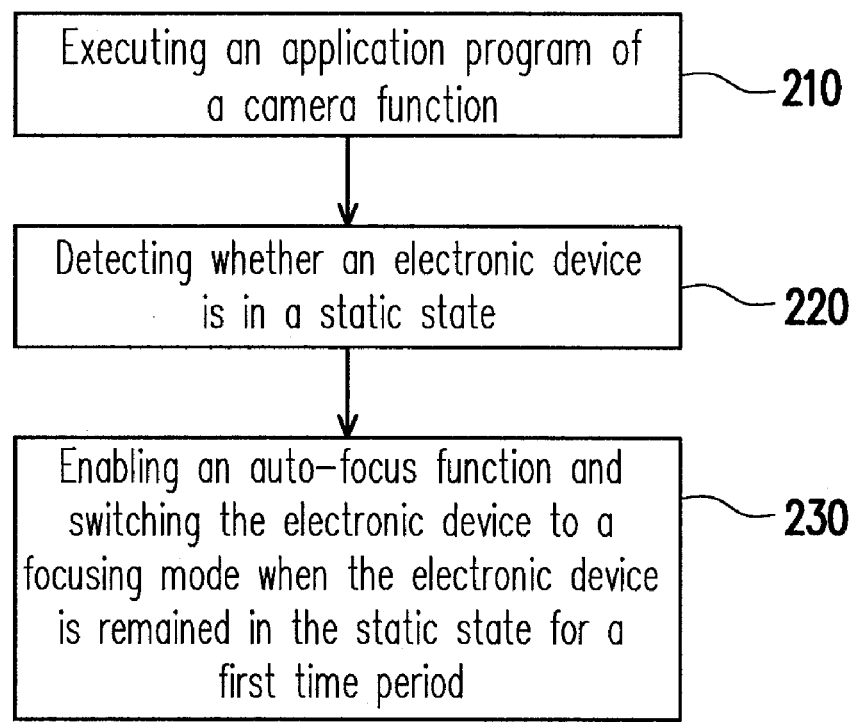
FIG. 2 is a flowchart illustrating a method for enabling the auto-focus function according to an embodiment of the present invention.

Based on operations of the static state detecting module 120 and the auto-focus module 130, manually enabling the auto-focus function is avoided when the user wants to take pictures. In the following embodiment, operations of various modules of the electronic device 100 are described. FIG. 2 is a flowchart illustrating a method for enabling the auto-focus function according to an embodiment of the present invention.

Referring to FIG. 1 and FIG. 2, first, in step 210, an application program of the camera function within the electronic device 100 is executed. The user generally seeks an image wanted to be captured by moving the electronic device 100. When the electronic device 100 is in a moving state, in step 220, the static state detecting module 220 continually detects whether the electronic device 100 stops moving and enters the static state. In the present embodiment, the static state detecting module 220 determines whether the electronic device 100 is in the static state according to the preview images captured by the image capturing unit 110, and detailed descriptions thereof are described later.

Next, in step 230, when the electronic device 100 is remained in the static state for a first time period (for example, 1 second), it represents that the user probably has found the picture desired to be captured. Therefore, the auto-focus module 130 enables the auto-focus function of the electronic device 100, so that the image capturing unit 110 can implement the focusing action, and meanwhile the electronic device 100 is switched to the focusing mode. Then, the user can directly press the capture button to capture a clear picture.

In the present embodiment, whether the user is ready to capture an image is determined according to whether the electronic device 100 is remained in the static state for the first time period so as to enable the auto-focus function. Accordingly, manually enabling the auto-focus function is unnecessary, and the user can directly press the capture button to capture the image when the electronic device 100 is in the focusing mode.

It should be noted that the static state detecting module 120 determines whether the electronic device 100 is remained in the static state every time period (which is referred to as a second time period, and the second time period is less than the first time period). Before the time for the electronic device 100 being remained in the static state reaches the first time period, the static state detecting module 120 also determines whether the electronic device 100 is remained in the static state every the second time period.

Figure 3:
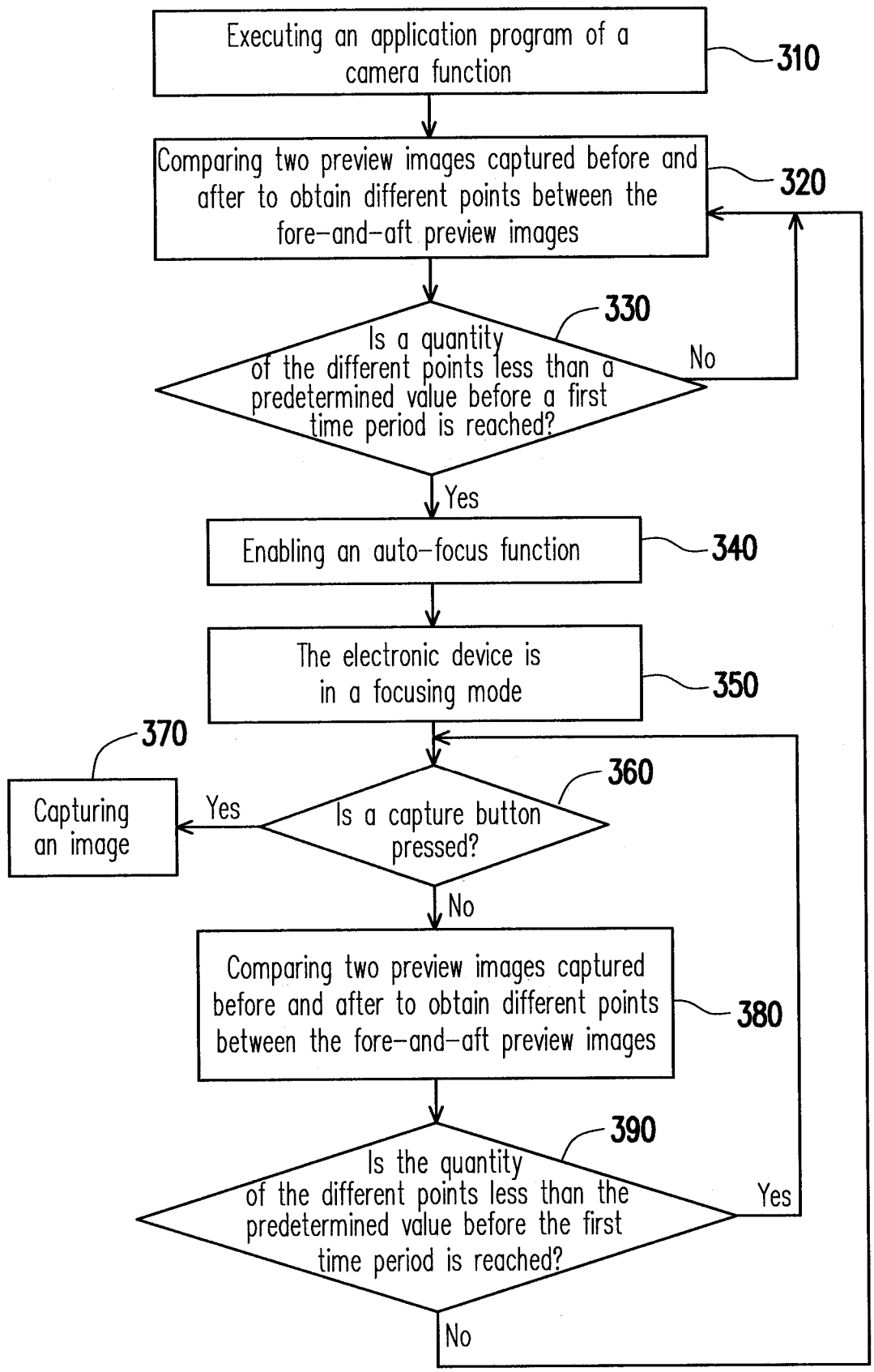
FIG. 3 is a flowchart illustrating a method for enabling the auto-focus function according to another embodiment of the present invention.

In the following embodiment, steps for judging whether the electronic device 100 is in the static state are described in detail. FIG. 3 is a flowchart illustrating a method for enabling the auto-focus function according to another embodiment of the present invention. Referring to FIG. 1 and FIG. 3, in step 310, an application program of the camera function within the electronic device 100 is executed. During execution of the application program, the image capturing unit 110 is still in an un-focusing state.

Once the application program is executed, the image capturing unit 110 continually captures the preview images, and in step 320, the static state detecting module 120 obtains a latest preview image and a previous preview image every the second time period (for example, 0.1 second), and compares the two preview images captured before and after, so as to obtain different points between the two preview images. In an embodiment, the different points can be variations of pixel brightness of the preview images. In detail, a brightness of a pixel fetched from a specific position of the latest preview image is compared to a brightness of a pixel fetched from the same position of the previous preview image, and the variation of the pixel brightness is regarded as the different points of the preview images. In another embodiment, the different points can be moving of edge positions of the two preview images. Namely, specific edge positions are obtained from the two preview images captured before and after, and when the specific edge positions are different, it can be regarded as the different point of the preview images.

If a quantity of the different points of the two preview images captured before and after is less than a predetermined value, the static state detecting module 120 then determines that the electronic device 100 is in the static state. When the electronic device 100 is in the static state, the static state detecting module 120 still obtains the different points of the two preview images captured before and after every the second time period. Next, in step 330, before the time for the electronic device 100 being remained in the static state reaches the first time period, whether the quantity of the different points each time detected by the static state detecting module 120 is less than the predetermined value is determined. As long as any detected quantity of the different points is greater than or equal to the predetermined value, it represents that the electronic device 100 is no longer in the static state, and the step 320 is repeated.

However, if before the time for the electronic device 100 being remained in the static state reaches the first time period, the quantity of the different points each time detected by the static state detecting module 120 is less than the predetermined value, it represents that during the first time period, the electronic device 100 is remained in the static state. Then, in step 340, the auto-focus module 130 enables the auto-focus function of the electronic device 100. Next, in step 350, the electronic device 100 is switched to the focusing mode.

Next, in step 360, whether the user presses the capture button on the electronic device 100 is determined. If the user presses the capture button, in step 370, the image is then directly captured by the image capturing unit 110 of which the focusing action is completed. If the user does not press the capture button, whether the electronic device 100 is in still in the static state is continually detected. In detail, in step 380, the static state detecting module 120 continually compares the two preview images captured before and after every the second time period to obtain the different points. Next, in step 390, before the first time period is reached, whether the quantities of the different points are all less than the predetermined value are determined.

If the quantities of the different points are all less than the predetermined value, it represents that the electronic device 100 is still in the static state. Then, the step 360 is repeated for determining whether the user presses the capture button for capturing the image. However, once any detected quantity of the different points is greater than or equal to the predetermined value, it represents that the user moves the electronic device 100 for a wide range. Now, the auto-focus module 130 dismisses the focusing mode of the electronic device 100, and the step 320 is repeated, by which whether the electronic device 100 is in the static state is again detected by the static state detecting module 120.

As shown in FIG. 3, when the user wants to capture images via the electronic device 100, the user can stay the electronic device 100 in front of an object desired to be captured, and remain the electronic device 100 in the static state for the first time period. Then, the electronic device 100 can execute the auto-focus function, and accordingly the image capturing unit 110 can complete the auto-focus action. Thereafter, the user can directly press the capture button for capturing a correctly focused and clear image.

It should be noted that the aforementioned method for enabling the auto-focus function can be executed on any electronic device having a processor. In other words, the aforementioned embodiment can be designed as a computer program comprising a plurality of program codes, and the computer program can be stored into a storage medium (such as an optical disc, a floppy disk, or a removable disk, etc.). After the computer program is loaded to the electronic device, the aforementioned method for enabling the auto-focus function then can be executed on the electronic device.

The present invention also provides a computer program product formed by a plurality of program instruction segments (for example, setting program instruction segments or deployment program instruction segments, etc.). After these program instruction segments are loaded to the electronic device having the camera function, the aforementioned steps for enabling the auto-focus function are then implemented, and meanwhile the electronic device can implement the aforementioned functions. Wherein, the computer program product can be stored in any data storage device (such as a read only memory, a random access memory, a magnetic tape, a floppy disk, a hard disk, an optical disc and a transmission medium, etc.) or can be directly provided by a network transmission, which is not limited by the present invention.

Further, the user can directly obtain the data storage device storing the computer program product, and load the program instruction segments into the electronic device, so that the electronic device can execute the aforementioned method for enabling the auto-focus function. Besides, the user can also download the program instruction segments of the computer program product for the electronic device via a network (for example, a cable network or a wireless network, etc.) under various network structures such as a client-serve network structure or a peer-to-peer (P2P) network structure. After the program instruction segments are executed, the electronic device is then capable of enabling the auto-focus function.

In summary, according to the method for enabling the auto-focus function, the electronic device thereof, the storage medium thereof and the computer program product using the same, when the electronic device is remained in the static state for a specific time period, the auto-focus function can be enabled. Therefore, when the user wants to capture an image, manually enabling the auto-focus function is not required, and the user can directly press the capture button to obtain a clear image. Therefore, actions for capturing images can be more fluent, and meanwhile a convenience of capturing the images can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for enabling an auto-focus function, adapted to an electronic device having a camera function, the method comprising:
    detecting whether the electronic device is in a static state by continually capturing preview images and by comparing two preview images captured before and after every a second time period, so as to obtain different points between the two preview images captured before and after;
    determining the electronic device to be in the static state if any quantity of the different points is less than a predetermined value: and
    enabling the auto-focus function and switching the electronic device to a focusing mode when the electronic device is remained in the static state for a first time period, wherein the second time period is less than the first time period.

2. The method for enabling an auto-focus function as claimed in claim 1, wherein if the electronic device is remained in the static state for the first time period, the step of enabling the auto-focus function and switching the electronic device to the focusing mode comprises:
   comparing the two preview images captured before and after every the second time period for obtaining the different points; and
   enabling the auto-focus function and switching the electronic device to the focusing mode if a quantity of the different points detected each time is less than the predetermined value before the first time period is reached.

3. The method for enabling an auto-focus function as claimed in claim 1, wherein the different points comprise variations of pixel brightness of the preview images.

4. The method for enabling an auto-focus function as claimed in claim 1, wherein the different points comprise moving of edge positions of the preview images.

5. The method for enabling an auto-focus function as claimed in claim 1, wherein after the step of enabling the auto-focus function and switching the electronic device to the focusing mode, the method further comprises:
   comparing the two preview images captured before and after every the second time period for obtaining the different points; and
   dismissing the focusing mode if the quantity of the different points is greater than or equal to the predetermined value.

6. An electronic device, comprising:
   a static state detecting module, for detecting whether the electronic device is in a static state by comparing two preview images captured before and after every a second time period, so as to obtain different points between the two preview images captured before and after, and if any quantity of the different points is less than a predetermined value, the electronic device is judged to be in the static state;
   an auto-focus module, coupled to the static state detecting module, for enabling an auto-focus function and switching the electronic device to a focusing mode when the electronic device is remained in the static state for a first time period, wherein the second time period is less than the first time period; and
   an image capturing unit, coupled to the static state detecting module and the auto-focus module, for continually capturing preview images:

7. The electronic device as claimed in claim 6, wherein the different points comprise variations of pixel brightness of the preview images.

8. The electronic device as claimed in claim 6, wherein the different points comprise moving of edge positions of the preview images.

9. The electronic device as claimed in claim 6, wherein the static state detecting module compares the two preview images captured before and after every the second time period for obtaining the different points, and if the quantity of the different points detected each time is less than the predetermined value before the first time period is reached, the auto focus module enables the auto-focus function, and the electronic device is switched to the focusing mode.

10. The electronic device as claimed in claim 6, wherein when the static state detecting module determines that the quantity of the different points is greater than or equal to the predetermined value, the auto-focus module dismisses the focusing mode of the electronic device.

11. A non-transitory storage medium, for storing a computer program, wherein the computer program includes a plurality of program codes, which is loaded to an electronic device for executing a method for enabling an auto-focus function, the method comprises:
   detecting whether the electronic device is in a static state by comparing continually capturing preview images;
   comparing two preview images captured before and after every a second time period. so as to obtain different points between the two preview images captured before and after:
   determining the electronic device to be in the static state if any quantity of the different points is less than a predetermined value; and
   enabling the auto-focus function and switching the electronic device to a focusing mode when the electronic device is remained in the static state for a first time period, wherein the second time period is less than the first time period.

12. The non-transitory storage medium as claimed in claim 11, wherein if the electronic device is remained in the static state for the first time period, the step of enabling the auto-focus function and switching the electronic device to the focusing mode comprises:
   comparing the two preview images captured before and after every the second time period for obtaining the different points; and
   enabling the auto-focus function and switching the electronic device to the focusing mode if the quantity of the different points detected each time is less than the predetermined value before the first time period is reached.

13. The non-transitory storage medium as claimed in claim 11, wherein the different points comprise variations of pixel brightness of the preview images.

14. The non-transitory storage medium as claimed in claim 11, wherein the different points comprise moving of edge positions of the preview images.

15. The non-transitory storage medium as claimed in claim 11, wherein after the step of enabling the auto-focus function and switching the electronic device to the focusing mode, the method further comprises:
   comparing the two preview images captured before and after every the second time period for obtaining the different points; and
   dismissing the focusing mode if the quantity of the different points is greater than or equal to the predetermined value.

* * * * *